United States Patent [19]

Gifford

[11] Patent Number: 4,845,658

[45] Date of Patent: Jul. 4, 1989

[54] INFORMATION METHOD AND APPARATUS USING SIMPLEX AND DUPLEX COMMUNICATIONS

[75] Inventor: David K. Gifford, Cambridge, Mass.

[73] Assignee: Massachusetts Institute of Technology, Cambridge, Mass.

[21] Appl. No.: 936,641

[22] Filed: Dec. 1, 1986

[51] Int. Cl.⁴ ............................................. G06F 15/40
[52] U.S. Cl. ................................. 364/900; 364/932.8
[58] Field of Search .................. 364/200 MS, 900 MS

[56] References Cited

U.S. PATENT DOCUMENTS 3,771,134  11/1973  Huettner ............................. 364/200
4,787,063  11/1988  Muguet ............................... 364/900
4,788,657  11/1988  Douglas et al. ..................... 364/900

OTHER PUBLICATIONS

Hudson; "Prestel: The Basis of an Evolving Videotex System," Byte Publications Inc., July 1983, pp. 61–77.
Gifford et al, "The Application of Digital Broadcast Communication to Large Scale Information Systems," IEEE Journal on Selected Areas in Communications, vol. SAC-3, No. 3, May 1985, pp. 457–467.
Frezza, "The Broadband Solution–Metropolitan CATV Networks," Videotex '84, Online Publications, Online Conferences Ltd., Pinner, UK, pp. 465–469.
Gates et al, "The INDAX Two-Way CATV Network for Videotex Service," Videotex '82 Online Publications, Online Conferences Ltd., Pinner, UK, pp. 465–469.
Boston Community Information System User's Manual (Version 8.17), Sep. 1986.

Primary Examiner—Gareth D. Shaw
Assistant Examiner—Kevin A. Kriess
Attorney, Agent, or Firm—Hale and Dorr

[57] ABSTRACT

An information delivery method and apparatus uses a simplex channel from a central data base site for transmitting data stored at the site to a plurality of remote local terminals. The local terminals receive the broadcast data and selectively store a subset of the data. The local terminals can process user initiated queries directed to the stored data, and determine whether the data is available at the local terminal or at the central data base site. The local terminal can automatically access data not available in its data base. The remote local terminal has a facility for selectively storing only that information of particular interest to the local user and provides for listing desired information in a prioritized fashion and allocating memory to each category. A predicate data base model is developed for advantageously storing the information.

40 Claims, 8 Drawing Sheets

SYSTEM BLOCK DIAGRAM

SYSTEM BLOCK DIAGRAM

DATABASE DESCRIPTIONS AND QUERY RESULT SETS

INFORMATION METHOD AND APPARATUS USING SIMPLEX AND DUPLEX COMMUNICATIONS

The Government has rights in this invention pursuant to contract No. N00014-83-K-125 awarded by DARPA.

BACKGROUND OF THE INVENTION

The invention relates generally to a method and apparatus for delivering and retrieving information, and in particular, to an information delivery method and apparatus employing digital simplex broadcast communication for transmitting information to one or more remote computer systems.

The computer is an excellent communications medium because of its ability to process, index, edit, and display information. That capability can be and has been applied on a large scale to communications within a community. However, building a computer system large enough to serve a community is a difficult problem. The problems are based in part upon cost as well as the capability necessary to serve many thousands of users from a central data source.

A community communications system should be able to serve an entire metropolitan area at a reasonable cost. The system should have a high quality user interface that is easily mastered by the most "computer illiterate" users. The privacy of individual users must be safeguarded while, at the same time, the services provided by the system should be secure and made available only to authorized users. The users should be able to process information drawn from the system in any way that they desire, and the user should also be able to have access to very large data bases. Finally, the system should be capable of having new applications added to its existing infrastructure without adversely affecting the previous operation of the equipment.

These problems have been approached in the past by broadcast systems wherein, for example, satellites broadcast data to a customer base. If customer received data contains uncorrectable errors, he can call the central data system using a standard duplex communication path to obtain the correct data. The prior art broadcast systems, however, are not designed to apply to the mass public and do not provide a convenient, easy to use system wherein the user is able to actively interface with a central data base and wherein the user has substantial control over information locally stored at his terminal.

Accordingly, therefore, it is a primary object of this invention to provide a user interactive information delivery apparatus and method in which the user can customize information stored locally and have access to a larger, more complete data base should that be required.

Other objects of the invention are an information delivery method and apparatus which is cost effective, which provides a high quality user interface, which provides users with a wide variety and large volume of information, which provides a safeguard to the privacy of users, which can be easily extended to new services, which allows users to process information from the system according to their needs, and which can be easily expanded to new applications within the existing infrastructure of the method and apparatus.

SUMMARY OF THE INVENTION

The invention relates to an information delivery method and apparatus for delivering information from a central site having at least one data base, to a plurality of remote sites wherein the data can be processed and stored in accordance with instructions specified by an end user. The information delivery method features storing information at a central data base site, transmitting data from the stored information over a broadcast simplex communications system, and locally receiving the broadcast data at a remote, local-receiver terminal. The method further features locally storing at the remote terminal a selected subset of the received broadcast data, searching the locally stored data in response to a user inquiry for displaying the locally stored data responsive to the user inquiry, and, if necessary, automatically communicating the user inquiry over a duplex communications channel to the central data base site when the local receiver terminal cannot adequately respond to the user inquiry. The method further features the step of responding, at the central data base site, to the locally generated user inquiry over the duplex communications channel by sending information stored at the central data base site in response to the user inquiry.

The searching step features the steps of determining whether a user inquiry can be satisfactorily answered by reference to data bases at the local terminal and at the central data base site and selecting, in response to the determination, the lowest cost data base to satisfy the user inquiry. In a preferred embodiment, the method further suggests narrowing, if necessary, a user inquiry for satisfying the inquiry with the available data base information.

In another aspect of the invention, the user inquiry responding step features the step of effecting backcalls from the central data base site to the local terminal for providing incremental results when they become available and the communicating step features the step of aborting an automatically initiated inquiry to the central data base site. In another aspect of the invention, the responding step features the step of controlling the flow rate of data from the central data base site in response to a user initiated, local terminal inquiry.

The information delivery apparatus according to the invention features a receiver and information storage media at a central data base site, a transmitter for transmitting data stored in the information storage over a broadcast simplex communication system, a receiver local to a remote station for receiving the broadcast data, and a device at the central data base site, responsive to a user inquiry from the local terminal over a duplex communications system, for responding to that locally generated user inquiry by sending information responsive to the user inquiry to the local terminal. The local receiver further features a storage element for locally storing a selected subset of the received broadcast data, a responsive element which, in response to a user inquiry, searches the locally stored data for displaying that data which is responsive to the user inquiry, and communication means for automatically communicating the user inquiry over a duplex communications system to the central data base site when the local receiver terminal cannot fully respond to the user inquiry.

In specific aspects, the information storage at the central data base site is a predicate modeled data base system having a plurality of independent data bases. Each data base features a plurality of records, each record having a plurality of required fields and one or more optional fields. The required fields include at least one of a record type, a record entry date, a record entry time, and one or more record textual descriptors.

The general subject of the invention is also described in Gifford et al, "An Architecture for Large Scale Information Systems", ACM, December, 1985.

BRIEF DESCRIPTION OF THE DRAWINGS

Other objects, features, and advantages of the invention will appear from the following description taken together with the drawings in which.

DESCRIPTION OF A PARTICULAR PREFERRED EMBODIMENT

Figure 1:
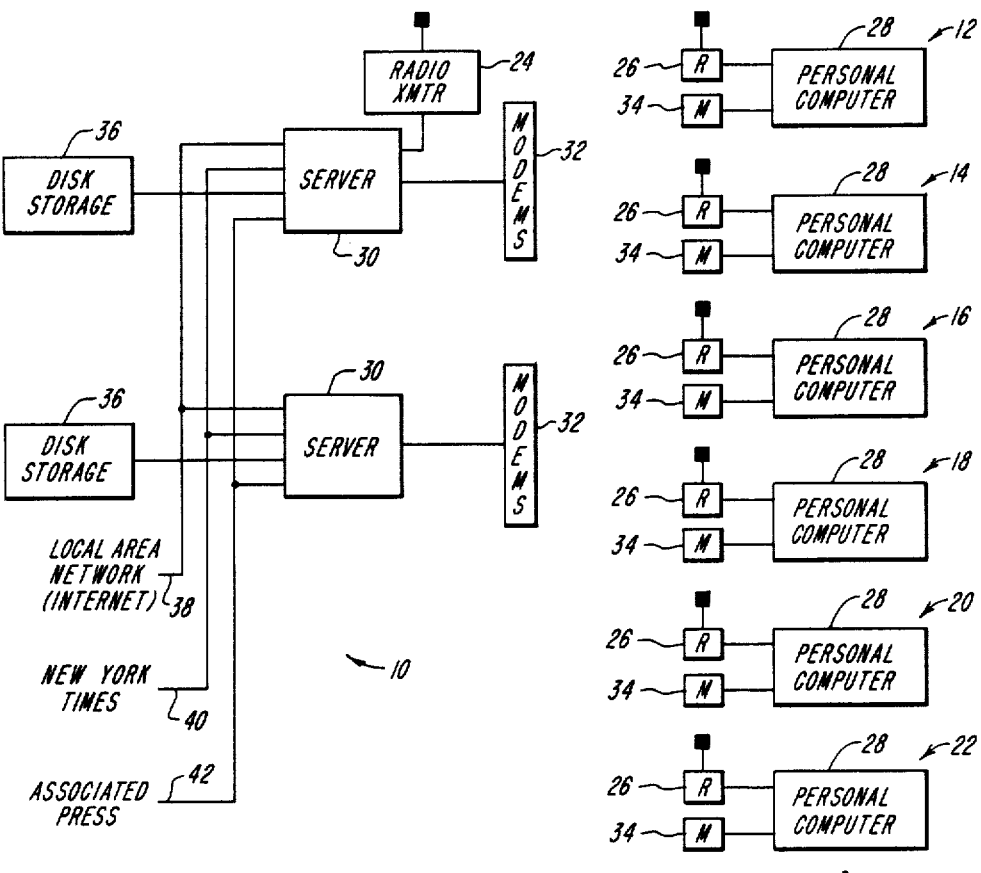
FIG. 1 is a block diagram of a typical data delivery system in accordance with the invention.

An information delivery apparatus, in accordance with a preferred embodiment of the invention, has a central data base site 10 and a plurality of remote local terminal sites, for example sites 12, 14, 16, 18, 20, 22, . . . . Communications between the central site and the local sites is available, as needed, over two separate channels. A simplex system using digital broadcast communications provides one communications link, while a conventional modem based duplex communication system for use over telephone lines, for example, provides the second link.

The simplex communications link uses a radio transmitter 24 located at the central data base site to transmit data to each of the listening local terminals. Each local terminal has a data receiver 26 which receives, and makes available to the remainder of the local terminal, the data provided by the central data base site. That data is, as described hereinafter, processed, and a subset of the data (typically different for each terminal) is selectively stored at the local terminal by a computer, preferably a personal computer 28, available at each remote local site.

The duplex communications link is effected using standard modem communications over a telephone line communications path. At the central site 10, as described in more detail below, there are typically a plurality of data bases. These data bases are associated with central site data servers 30 and associated with each data server 30 is a modem 32 operating as is well known in the art. At each local terminal, a compatible modem 34 completes the necessary duplex communications link to enable the transfer of data from the central site to the remote site and vice versa.

Associated with each central site server 30 is a storage element, disk storage 36 in the illustrated embodiment, for storing the data base(s) associated with a server 30. New data is constantly made available to the central data base site from, for example, electronic mail delivery connections over a local area network line 38, or to various newspaper networks over lines 40 and 42.

When a shared server receives new information, the information is queued for transmission to the remote terminals through a broadcast packet radio system such as that described, for example, in Gifford et al, "The Application of Digital Broadcast Communication to Large Scale Information Systems," *IEEE Journal on Selected Areas in Communications,* Vol. SAC-3, No. 3, May, 1985, the contents of which are incorporated herein, in their entirety, by reference. That data is then transmitted by radio transmitter 24.

The category into which the transmitted item falls determines both the number of times that the item will be transmitted (to improve reliability of transmission) and also the security key with which the transmission is encrypted. The broadcast data is received at the remote site, the local terminal, as a background task under which an operating system controlling the local terminal acquires such information and updates the locally stored data base. Thereafter, as described in greater detail below, the local terminal data base system processes inquiries or queries from the user. If the entire inquiry cannot be processed at the local terminal, that terminal can establish a connection through modem 34 to a central data base site server 30 (through its modem 32) and acquire the necessary information from the central site data base.

As noted in FIG. 1, each server connects to all of the information sources and each server has associated therewith its own modem and disk storage media. Accordingly, the servers need not be located at the same physical site and can themselves be connected via communication lines or local area networks to share the information provided from outside data sources. In accordance with the invention, however, all of the data bases associated with the servers 30, whether they are associated with one physical location or whether they are physically separate, are collectively referred to as the central data base site. The invention provides for the integration of the local data base at the local terminal and the data bases at the servers 30 into a single data base environment which enables the entire stored information to be available to the user. Further, in accordance with the invention, each user is provided with means for prioritizing the areas of information of particular interest to him as well as providing a budget for each item, that is, a maximum quantity of memory to be allocated for each category of information. Accordingly, the local data base at each user's terminal is customized for the particular user. This is discussed in greater detail hereinbelow.

The Predicate Data Base

In order to improve performance and organization of the described information delivery system, a new data base model, hereinafter called the predicate data base model, is employed by the system. The predicate data base model is designed for information retrieval applications and provides full text searching capability.

A predicate data base consists of a set of records. Each record consists of a number of named fields. There are required fields (such as type and date), as well as optional fields. A predicate data base can be mutable (that is, records can be altered), immutable (that is, the records can never be altered), or append-only (that is, records can be added to a data base but existing records are immutable). The fundamental operation on a predicate data base is to restrict inquiries to a subset of the records in the data base. A specification of a subset of the data base is called herein a "query" and the computation of a data base subset responsive to a query is referred to as "query processing." Once a subset has been selected, the records contained in the subset can be retrieved or deleted.

The predicate data base model provides the user with a great deal of flexibility in the formulation of queries. This is important in an information delivery system operating in a community where the users know certain things about the record they are looking for but are unable to necessarily produce a single unique keyword that identifies the information of interest. The predicate data base model permits users to express what they know about the records they are looking for by defining a predicate that matches each such record.

In the predicate data base model, the inquiry (or query) (and the results of the search, designated the "result set"), are defined as follows. Each query initiates a predicate function, which returns a true or a false result when applied to a record depending upon the content of the record. The query is a boolean combination of "predicates" and is therefore itself a predicate. Each predicate describes a characteristic of the data being searched, for example, a time period, a category (such as financial), an author, etc. A record is said to match a query (and vice versa) if and only if the query predicate returns a true result when applied to the record. That is, a record "X" is in the result set of a query "Q" if and only if it matches the query "Q."

In accordance with the predicate data base model, predicates permit selection on the basis of record type (generally speaking, the source of the information), the record date and time (that is, the date and time a record was inserted into the data base), and the presence of arbitrary words or phrases in the record or in the specific textual record field such as the subject, author, or priority field of the record. Such words may include, for example, the name of the author, a category of the subject such as movie review or financial, or the priority field such as, for example "urgent." All of these predicates can be combined by logical boolean operations to form a more descriptive predicate.

The predicate data base model has two important advantages over traditional data base models, such as the relational data semi-structured information that cannot be easily indexed within the framework of the more traditional approach. Accordingly, some data suggests that the predicate based approach is preferred by novices as well as experienced users. The second advantage is that this data base provides a framework for reasoning about the content of the data base. Accordingly, in accordance with the claimed invention, if a piece of information is not found in a data base, it is assumed, in accordance with the prior art, not to exist. This assumption is not desirable in accordance with the claimed invention, where there are many data bases and wherein no single data base necessarily contains all of the available information.

Figure 2:
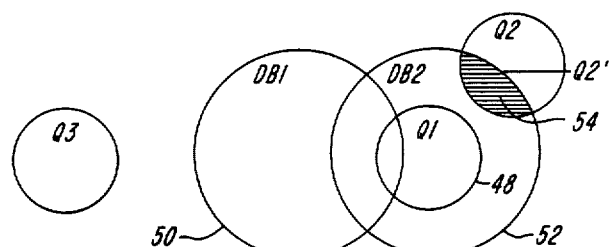
FIG. 2 is a block diagram illustrating a predicate model data base structure in accordance with a preferred embodiment of the invention.

Accordingly, therefore, to determine whether a query can be processed, the system must be able to "reason" about the content of the data bases. Referring to FIG. 2, a query Q1 can thus describe a potential result set that is only partially contained in data base 50, but is contained entirely in data base 52. Thus, the query Q1 can most advantageously be processed at data base 52. In addition, however, a query Q2 can describe a potential result set that is only partially contained in data base 52. In this case, the apparatus and method cannot guarantee that the result of processing query Q2 at data base 52 will find all of the information of interest. In accordance with the preferred embodiment of the invention, the apparatus suggests another query to the user, a query designated as 54, which is completely contained in data base 52. If the user agrees to this revised query, the result set will be fully contained in data base 52. A third and final instance is represented by query Q3, which is disjointed from both data bases 50 and 52. This query cannot be processed using only data bases 50 and 52 and therefore is rejected.

The ability to reason in this manner with regard to the queries presented to the apparatus is central to the strategy for query processing. The query language itself is used to formally describe the content of each data base. Content descriptions and queries are formalized in a logical system that has an efficient decision procedure. Thus, the predicate data base model allows the apparatus to view several simple data bases together as a single composite data base. The content of a data base can be described by a boolean combination of predicates and this implies that a joint content of a set of data bases can be described by the disjunction (logical OR) of the expressions that describe the component data bases. If a query falls within the scope of the composite data base, the result set can be obtained by submitting the query to each of the component data bases and taking the union of the results thus obtained.

The expressions that describe the component data bases can be employed to determine which of them contains information needed to process a query. This gives rise to a concept of "query routing," described in detail below. Rather than submitting the query to all of the component data bases, it suffices to submit it to any set of data bases for which the disjunction of the content descriptions is implied by the query. A similar procedure can be used when adding records to a composite data base. A given append request can be applied to each component data base, but it suffices to apply the request to only those component data bases whose description predicates match the record being added.

It is important in connection with the availability of the independent data bases described herein that each data base, having a specific content description, can be taken off-line without affecting the system's ability to describe its own content. The composite data base manager must be aware of the change and update the predicate that describes its "server's" content. Similarly, new data bases can be added to the system without causing a disruption to the existing information. Accordingly, therefore, from the outside, a composite data base is indistinguishable from a single data base and the composite data base is referred to hereinafter as simply a data base.

The Central Data Base Site

Figure 3:
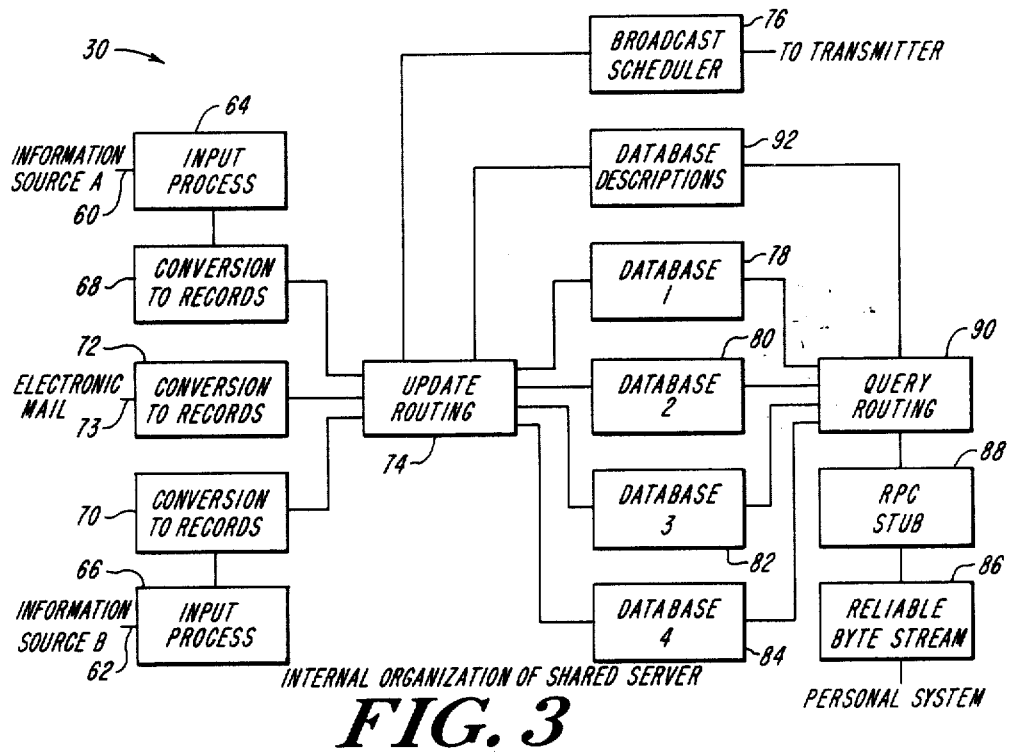
FIG. 3 is a system block diagram illustrating the internal structure of a central data base site in accordance with the preferred embodiment of the invention.

Referring to FIG. 3, according to the illustrated embodiment of the invention, the central data base site receives input information over lines 60, 62, for example, from the New York Times news service or the Associated Press news service. The input data is received by input circuitry 64, 66, respectively, as is well known in the art. The received data is directed to conversion circuitry 68, 70 respectively, which convert the input data, which has its own format for any particular source, to a standard record format to be used by the apparatus. The conversion apparatus, 68, 70, is also well known to those practiced in the art. The output of the conversion process, which also includes a conversion apparatus 72 for receiving electronic mail over a line 73 and converting that data to a record format useful in the system, is provided to an update routing circuitry 74. The electronic mail allows the apparatus to act as an electronic bulletin board. The outputs of conversion units 68, 70, 72 are then directed by update routing circuitry 74 to a broadcast scheduler 76 for the server 30 having a broadcast scheduler associated with it, as well as to selected ones of the data bases, data bases 78, 80, 82, and 84 in the illustrated embodiment. In other embodiments of the invention, a greater or fewer number of data bases can be associated with a server 30.

The broadcast scheduler 76 receives the data base records along with an expiration time for each record, an indication of how many times the record should be transmitted (for reliability of transmission), and the encryption key with which the record should be encrypted (for security purposes) prior to transmission. (Each encryption key that is used for securing transmitted material is assigned a unique key number. When the broadcast scheduler transmits a record it transmits both the key number that was used to encrypt the record, and the encrypted record itself. Records that are not encrypted are identified by a key number of zero.) The information broadcasts are then scheduled on the basis of this information. The broadcast scheduler also maintains a status display at the central data base site for the administrator of the system.

The data base insertion process appends new records to a data base depending upon the contents of the record and the descriptive predicate associated with the data base. In accordance with a preferred embodiment of the invention, a new version of the data bases is created every night, the data bases, including the information that arrived during the preceding twenty-four hour period, having immutable status. Each data base collects information from a specific source, according to the illustrated embodiment of the invention. Thus there is a separate data base for each type of information for each day. These data bases are kept on-line for a period of time which can vary, depending upon the source of the data base information. Eventually, however, a data base must be either archived or deleted.

The remainder of the central site apparatus at each server, interfaces with the local terminals. These components, collectively, are described as a remote procedure call interface. When the remote terminal connects to a server at the central data base site, a query process is assigned to manage the connection and to process requests from the local terminal. According to the illustrated embodiment of the invention, data from the local terminal is first processed by a byte stream interface module 86. This module, which uses error detection and correction codes to implement reliable data transmission, is connected to the central data base server's remote procedure call stub (RPC stub) module 88. The RPC stub module calls for the appropriate procedure in the server's query routing module 90. The query routing module 90 uses the descriptions of the available data bases, stored at 92, to determine a strategy for processing the request. The module 90 then applies the query to the appropriate data base or data bases and forwards the results to the local terminal through the modem communications system as the results become available. If a query extends over multiple data bases of a given type, but with different dates, the query is applied to the data bases, according to the illustrated embodiment of the invention, in reverse chronological order. This ensures that the most recent records of the result set are produced first. This approach often allows the local terminal to display a complete screen of results well before the query processing has been completed and enables the server to control, if desired, the flow rate of data passing to the local terminal.

In determining the query routing, the module 90 has available to it all of the data base descriptions which have been collected by the data base description circuitry 92 based on the update routing data passed to the data base storage elements.

In summary, in accordance with this illustrated embodiment of the invention, the shared data base servers at the data base central site perform three major functions. First, they accept data from information sources and add the data to their own data bases. Second, they transmit data updates to the local terminals through a simplex broadcast digital packet radio system, and third, they implement the remote call procedure interface to allow remote access by the local terminals.

Since the conceptual organization of the data in each data base server is modeled as a collection of data bases rather than one large data base, the information in each server is similarly organized as a collection of data bases. These data bases can reside on distinct storage units so that any data base can be physically removed from a server without affecting the remaining data bases. The existence of multiple internal data bases is transparent, at the interface, to the server. The query routing module 90 forwards each request to the proper set of data bases. Since the server is viewed as a collection of data bases, the data bases themselves can be regarded as units of information that are stored on a server. The ability to view predicate data bases as a basic unit of configuration provides a number of advantages. In particular, data bases can be relocated from server to server and the descriptive predicates associated with each server can be easily updated. Second, data bases can be replicated to achieve performance and availability goals as needed. Third, each data base can have its own representation and implementation, provided that all data bases implement the same interface. This is often useful when data bases store different categories of data.

The Remote Site

In accordance with the illustrated embodiment of the invention, each local terminal, a personal data base system, is, according to the illustrated embodiment, implemented using the IBM-PC family of computers. The computer operates in two basic modes. One process mode monitors the keyboard and the mouse, processes user requests, and writes to the computer display. The second process mode receives the incoming data and applies the data, selectively, to the local data base. A non-preemptive scheduling discipline is used and the data acquisition process must yield at regular intervals to give the user interface process a chance to run and vice versa.

Figure 4:
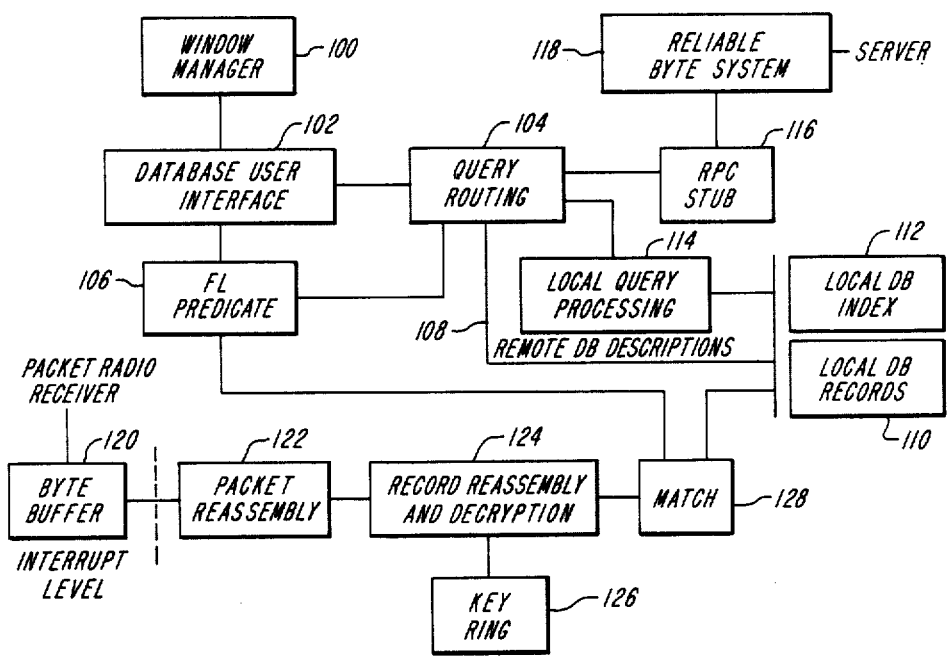
FIG. 4 is a system architecture block diagram illustrating the operation of the personal data base system at the local receiver terminal remote from the central data base site.

Referring to FIG. 4, a window manager circuitry 100 reads from the keyboard and the mouse, passes completed commands to a data base user interface 102, and updates the display as requested by that data base user interface. The data base user interface is responsible for implementing all commands and for formatting data base records for the display. A query routing module 104 is responsible for processing the inquiries or queries. The query routing process using a filter list 106 created by the user and predicate descriptions of the remote data bases available over a line 108, decides, as described in greater detail below, how and where a query should be processed. An index of available remote data bases is kept in local data base 110 and 112. This index can be updated via broadcast transmissions in the same manner as other data base records.

The local data base is stored on a storage device 110 an an index of what is stored is maintained in a local memory (RAM 112). As a reference, an average news article requires five kilobytes of disk storage and approximately 470 bytes of main memory. A local query processing module 114 provides the interface between query routing 104 and the available data stored at 110 and 112.

If a query must be directed to the central data base site, the query is directed through a local terminal RPC stub 116 and a reliable byte stream output unit 118 for transmission over the duplex channel, as is well known in the art. The query will be directed to the central data base site and in particular to the appropriate server(s) in response to the query routing module. Preferably, the reliable byte stream module 118 uses an autodial modem to establish communications with the central data base site.

In accordance with the illustrated embodiment of the invention, data arrives from the central site in accordance with the communications method described in the Gifford et al paper noted above, at a data rate of 4.8 kilobits per second, and is placed in a five kilobyte ring buffer 120 at an interrupt level. The size of the buffer thus accommodates a service latency of up to about ten seconds. This latency can be caused by activity in, for example, the user interface process.

The receiver polls the byte buffer and a packet reassembly buffer 122 reassembles packets from the received individual packets contained in the buffer. Each packet contains information for error detection and error correction. To mask channel errors, as noted above and in the Gifford et al paper, packets are transmitted more than once, and these transmissions are separated in time. When a previously unseen packet arrives, it is copied into its proper place in the packet reassembly buffer 122. A bit map of the received packets is maintained so that record reassembly, at 124, can determine when an entire record has arrived.

Once the entire record has arrived, its security key number is compared with the user keys on a key ring 126. If a matching key is found, the contents of the record are decrypted at 124, and, if the decrypted record matches any of the predicates in the filter list predicate 106, as indicated by a matching module 128, it is presented to the local data base for storage. The record may or may not be retained, however, depending upon storage availability, that is, depending upon the record's priority relative to the information already present. The match module 128 is designed so that the time required to match an incoming record is essentially independent of the complexity of the filter list predicate 106.

In the illustrated embodiment, each user is assigned a specific secret key which is included in his copy of the personal computer software. The user specific secret key is stored on key ring 126. A user is unable to print or otherwise access this user specific secret key. When a new service key (allowing access to a new service or range of data) for information access is to be provided to a user, either electronically or manually, the service key is first encrypted with the user's secret key, and then the encrypted service key is transmitted to the user. Thus key ring 126 must first decrypt all service keys with the user specific secret key before the service keys can be used to decode incoming transmissions. In addition to being used to decrypt incoming broadcast transmissions, service keys can serve as passwords for access to duplex based services.

An advantage of having a user specific secret key is that it makes service keys specific to a user. Thus service keys cannot be traded between users, and can be used effectively to limit access to the system to paying customers. Different service keys can be employed for each service offered by the system.

The Filter List

In summary, the personal data base system at the local terminal performs two concurrent tasks. It processes user requests and applies data base updates received over the digital broadcast channel to the local data base. To meet the objects of the invention, the system is designed so that a user's most frequent requests can be answered from the local terminal. To this end, a user compiles a list of routine queries into what is known as the filter list, the queries being stored at filter list predicate 106. The queries in the filter list are disjunctively combined (OR'ed) to create a predicate called FL (filter list) that describes the information that will be retained at the user's local terminal. This process can be performed dynamically during system operation. The local data base that results is precisely the set of records necessary to process any query in the filter list predicate.

A query in the filter list can be marked with special characters such that when a new record arrives that matches the query an audible alarm sounds or the record is automatically printed, or both.

The filter list predicate may describe more information than can be stored on the facility at the user's local terminal. When this occurs, the system must make a choice among records that match the filter list predicate, deciding which records to keep and which records to discard. To accomplish this end, the user component queries of the filter list predicate are prioritized and a "budget" is specified for each query of the filter list predicate. The budget indicates how much storage should be allocated to each query. Each record in the data base is associated with the most important query in the filter list predicate that it matches. When a new record arrives and matches a filter list predicate, and if the local terminal has insufficient resources to store it, the system attempts to make room for the new record by deleting records from queries in the filter list that are "over budget." If there is still insufficient room for a new record, the local terminal data base system will delete records from the queries included in the filter list predicate which are less important than the most important query that matches the new record.

It is because the system does not necessarily keep all records that match the filter list predicate, and because a local terminal may miss certain updates, for example when it is turned off or when there are uncorrectable channel errors, that the filter list does not accurately describe the contents of the local data base. A solution to this problem is to provide a separate predicate that describes the local data base exactly. This predicate can be obtained by conjoining each query of the filter list with an additional predicate that describes the set of time intervals for which the local data base has a complete set of data base updates.

User Interface and Query Processing

The present invention can be implemented either totally in hardware, totally in software, or through a combination of the two. In accordance with the preferred embodiment of the invention, a substantial portion of the invention is implemented in software, written in the language C and able to be run at the local terminal on IBM-PC compatible equipment, and at the central data base terminal on a Digital Equipment Corporation VAX computer. A complete program written in the C language for implementing the present invention, is listed in Gifford, "Boston Community Information Systems PC Program Source Code", Volumes I-VIII, 1986.

Figure 5:
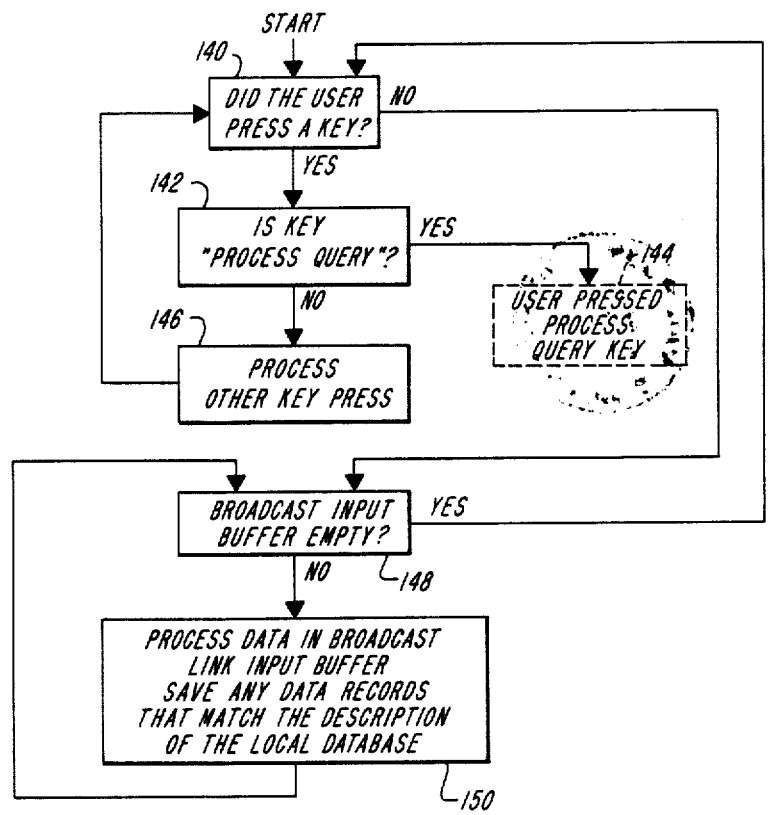
FIG. 5 is a flow chart illustrating operation of the system at the local station.

Referring now to FIG. 5, the local terminal provides significant user interaction. Once the program begins executing, the equipment tests, at 140, whether the user pressed a key. If he did, the equipment checks at 142 whether the key requires a query to be processed. If it does, a "user pressed process query key" subroutine is implemented at 144 (and described in connection with FIG. 6). If the process query key was not the key that was pressed, the apparatus proceeds to process at 146 in accordance with the key that was pressed and returns to block 140. It is important to note that the "query" can also be a request, for example, a request to place an order, etc., at a remote site. The system operation described herein is equally applicable to the system operation when a request is made.

If no key has been pressed, the apparatus switches to determine, at 148, whether the broadcast input buffer 120 is empty. If it is empty, the apparatus checks to see whether the user has pressed a key. If it is not empty, the apparatus processes the data in the broadcast buffer, and saves any data records that match the filter list description stored at this particular local terminal. This is indicated at 150. In this manner, the apparatus switches between the user interface and the broadcast input system.

Figure 6:
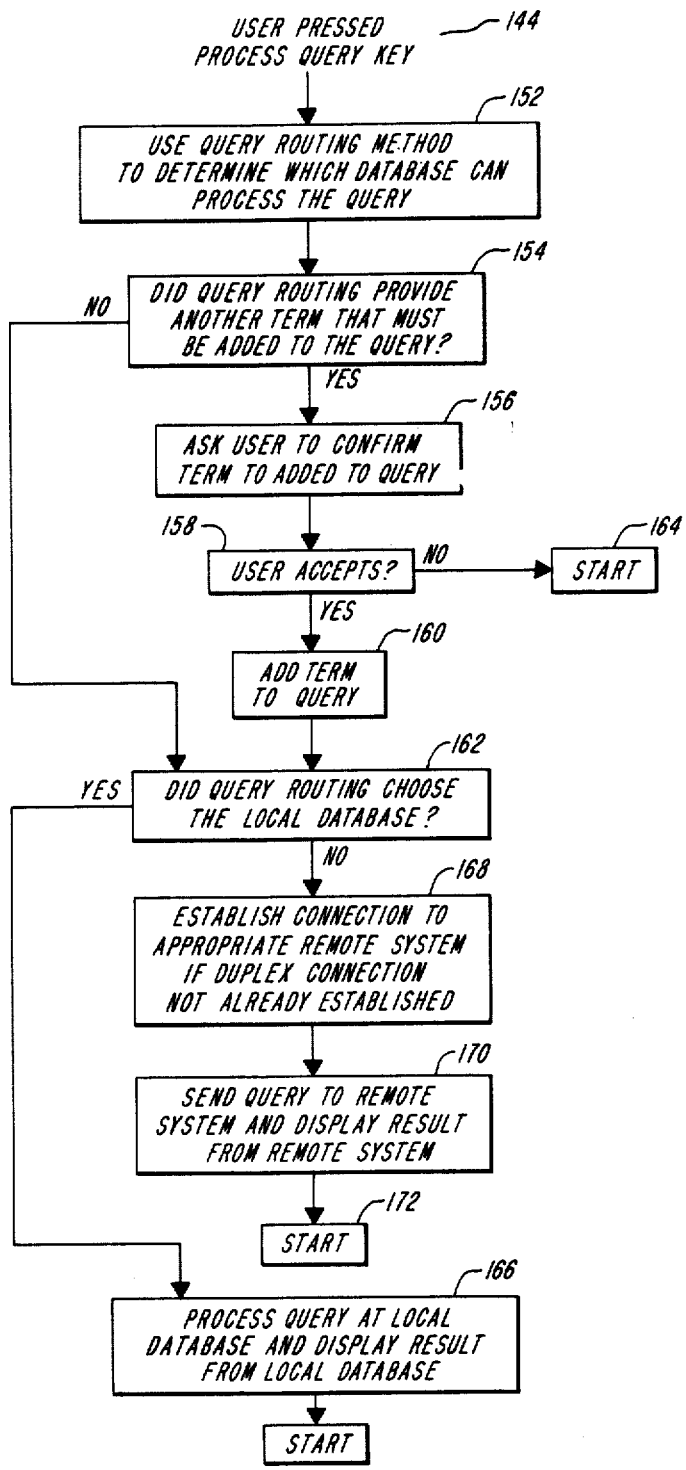
FIG. 6 is a flow chart illustrating the processing which occurs in accordance with a preferred embodiment of the invention when the user at a local terminal initiates a query inquiry.

Referring to FIG. 6, the "user pressed process query key" subroutine first uses a query routing method to determine which data base can process the query. This is indicated at 152 (see FIG. 7). If the query routing method provides that another term must be added to the query to narrow it, as tested at 154, the system, at 156, asks the user to confirm the addition of the narrowing term that is to be added to the query. If the user, at 158, accepts the narrowing term, the term is added to the query at 160 and processing continues with a determination of whether the query routing method chose the local data base. This is indicated at 162. If the user did not accept the additional term suggested at 156, the apparatus returns to the initial process as if the user query key had not been pressed. This is indicated at 164. If the query routing does not provide that another term be added, the apparatus steps directly from block 154 to the choice of local data base indicated at 162. If a local data base is chosen, the query is processed, at 166, at the local terminal, and the result displayed. Data is then taken solely from the local data base.

If the system requires that the central data base site be accessed, it automatically establishes, at 168, a connection to the appropriate server system (unless the duplex connection had already been established). The query is then sent, at 170, to the server system (the central data base site) and the result of the inquiry is displayed when received. The system then returns to the start condition at 172.

Figure 7A:
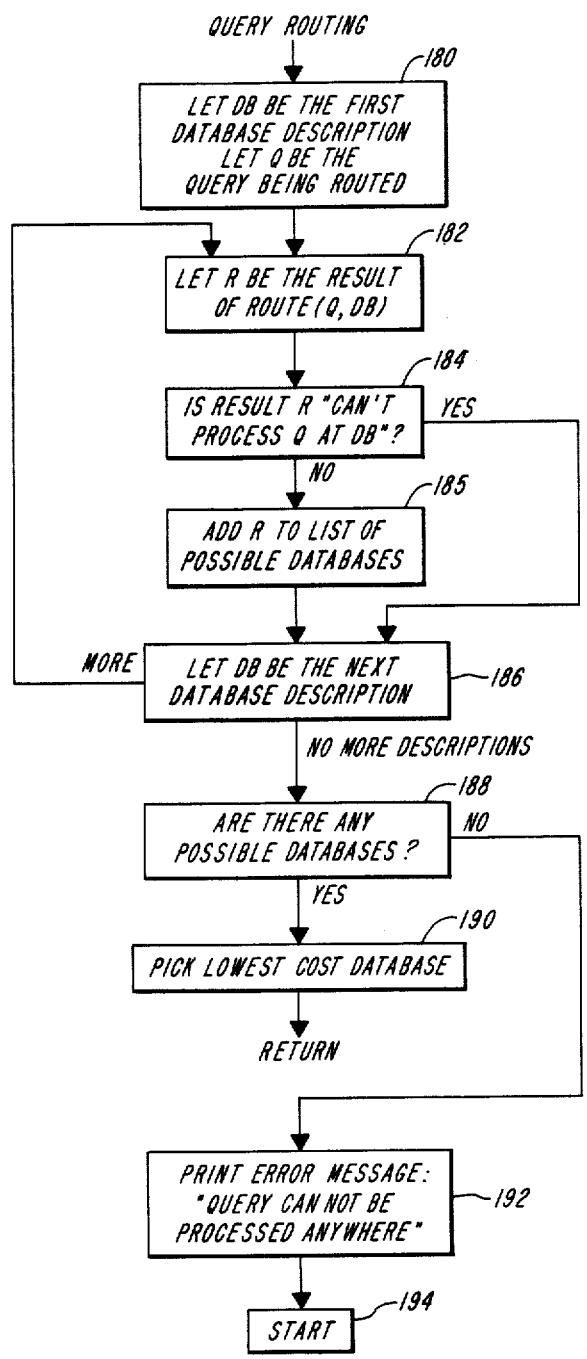
FIGS. 7A and 7B represent a flow chart illustrating the processing which occurs in implementing the query routing method in accordance with the preferred embodiment of the invention.

The query routing method, referring to FIG. 7A, makes use of the "truth" of a predicate statement. In accordance with the method, the apparatus has a list of data base predicate descriptions, including the descriptions of the local terminal data base as well as all central site data bases. The apparatus takes the first of the data base descriptions and designates it as "DB." It then defines "Q" as the query for which routing is necessary. This is indicated at 180. The apparatus then determines the result of a function "ROUTE(Q,DB)." The result of this function, designated "R" as indicated at 182, determines whether the query "Q" can be fully processed at data base DB. If the result "R" indicates that the query "Q" cannot be processed at "DB," tested for at 184, then the apparatus assigns to "DB" the next data base description, if there is one, and processes that description to determine the value of "ROUTE(Q,DB)." If the result "R" indicates that "Q" can be processed at "DB," then the result "R" is added to the list of possible data bases. This is indicated at 185 and the apparatus steps to check, at 186, the next data base (if any). Once all of the data bases have been checked, that is, once all of the predicate data base descriptions have been examined for this query, and there are no more data bases to be checked, the apparatus determines whether there is any data base available to answer this query. This is tested at 188. If there are possible data bases, the apparatus picks at 190 the lowest cost data base and returns to the query routing program call at 154. If no data base is available to answer this query, the apparatus prints an error message that the query cannot be processed anywhere, as indicated at 192, and returns to START as indicated at 194.

Figure 7B:
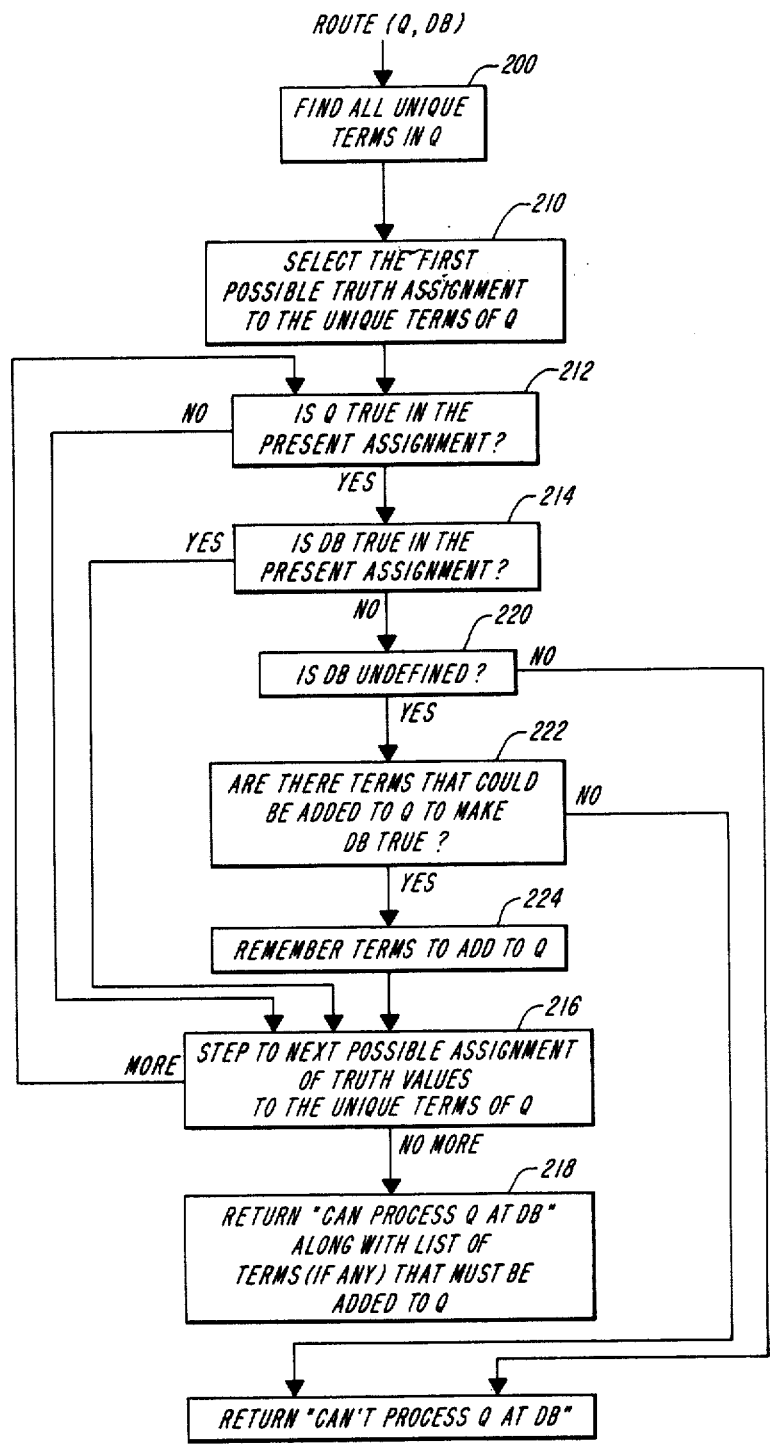

Referring now to FIG. 7B, the process for determining "ROUTE(Q,DB)" first finds, at 200, all of the unique terms, the elements of the predicate, of the query. It then selects the first possible truth assignment (equivalent to the logical boolean expression for the query) to the unique terms of the query. For example, if Q is "A and B," then the unique terms of Q are "A" and "B." The first possible truth assignment will be [A: false, B: false ], the second possible assignment will be [A: false, B true], the third possible assignment will be [A: true, B false], and the fourth and final possible assignment will be [A true, B: true]. This is indicated at 210. If the value of the query is true in accordance with the then present truth assignment, as tested at 212, the apparatus then determines, at 214, whether the data base is also true in connection with that present assignment. If the predicate DB is true, the method then steps to the next possible assignment of truth values to the unique terms of the query. This is indicated at 216. If there are no additional truth values, the apparatus returns, at 218, a "can process the query at this data base" and also provides a list of terms, if any, that must be added to the query to be able to process it.

If the data base, at 214, is not true for the present assignment, the apparatus tests to see whether the data base is undefined. For example, if Q is "(not A)" and DB is "A or C," then when Q is true in the truth assignment [A false], D will be undefined because the value of C is undefined. If DB is defined, then the apparatus returns that "the query cannot be processed at this data base." This is tested at 220. If the data base is undefined, the apparatus checks, at 222, whether terms could be added to the query to make the data base result true whenever the query is true. For example, in the above example where Q was "(not A)" and DB was "A or C," the extra term "C" could be conjoined with Q to make DB true whenever Q was true. If such limiting terms can be added, those terms are recorded at 224. If terms cannot be added, the apparatus returns to the calling program with the result that the query cannot be processed at this data base. In this manner, the apparatus determines the lowest cost for the data base at which the query can be resolved. The apparatus thus examines the query with respect to all data bases and, depending upon the costs of satisfying the query at each data base, the cost dependent upon whether, for example, duplex communication with the central data base site is necessary, the apparatus determines which data base, if any, will be used.

Figure 8:
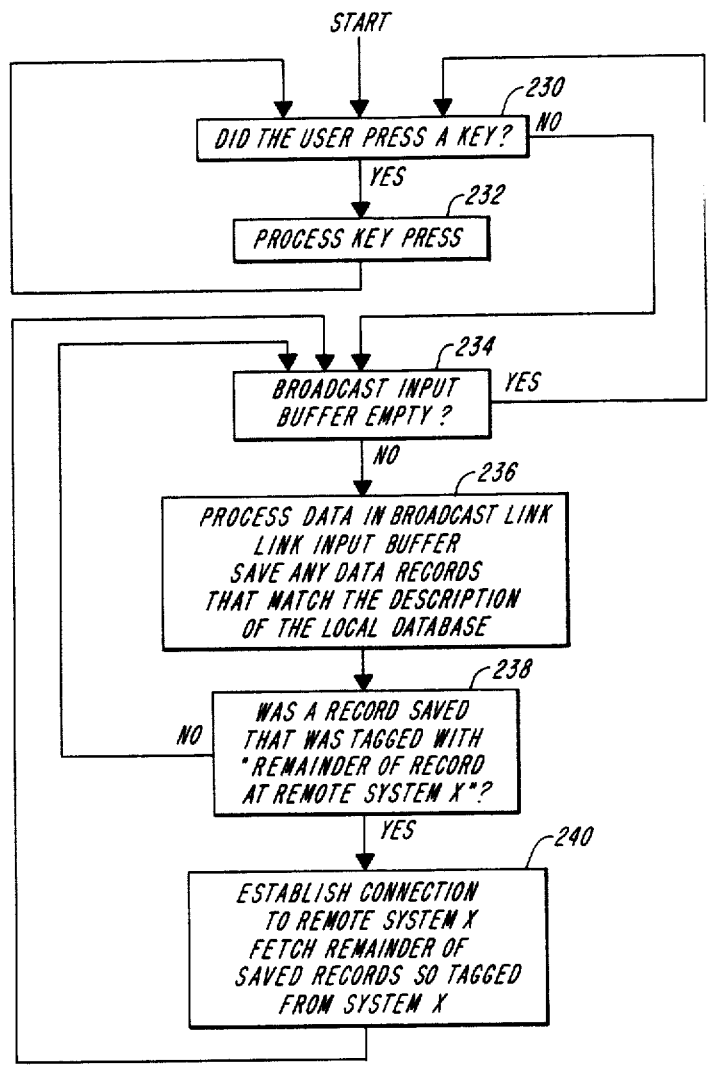
FIG. 8 is a flow chart showing an alternate embodiment of the data acquisition system operation at a local terminal.

In an alternate embodiment of the invention, the apparatus can also operate to determine whether a record, that was saved at the local data base, was tagged with an indication designating that the remainder of the record is available at the central data base site. In accordance with this embodiment, referring to FIG. 8, the apparatus operates in a manner similar to that of FIG. 5. Thus, the apparatus determines whether the user pressed a key at 230, and if a key was pressed, the apparatus processes the required key function at 232. If a key has not been pressed, the apparatus, at 234, checks the broadcast input buffer 120 to determine whether it is empty. If it is empty, the apparatus returns to check the keyboard. If it is not empty, the apparatus processes data in the broadcast input buffer and saves any data records that match the description provided by the filter list at the local terminal. This is indicated at 236.

After the data is processed, the apparatus checks, at 238, whether a saved record was tagged with a message that the a record was saved, the apparatus establishes a connection to the central site at the data base designated by the message. This is indicated at 240. The remainder of the record is then retrieved from the data base designated by the tagged record. The apparatus then returns to check the input buffer at 234.

Accordingly, the central data base site need not transmit over the simplex channel an entire record which may only be of interest to a relative few of the remote local terminals. Nevertheless, those terminals can access the central data base site to obtain the full contents of the record without, for example, reducing the total output of the central data base site over the simplex channel.

Figure 9:
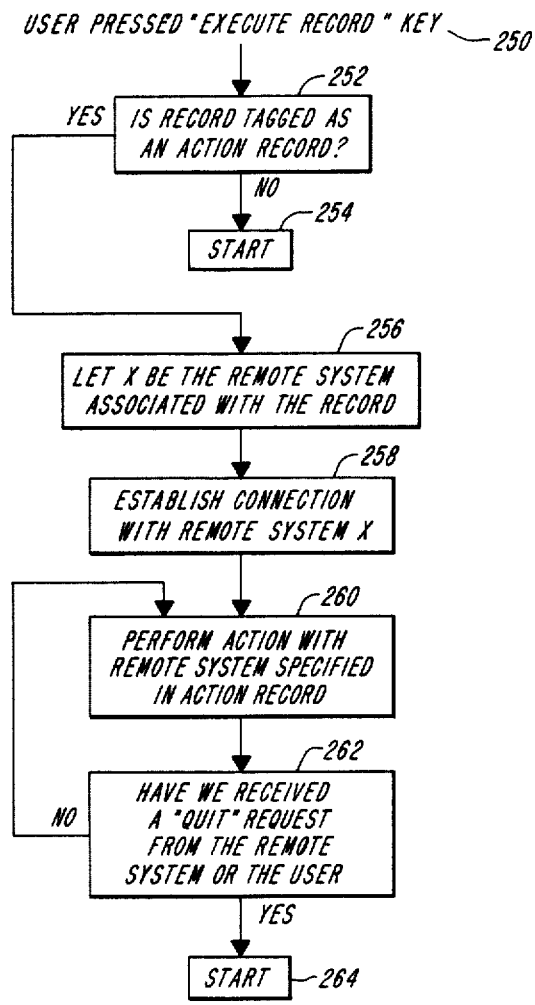
FIG. 9 is a flow chart illustrating the processing of an action record according to the illustrated embodiment of the invention.

Referring to FIG. 9, the information delivery apparatus having simplex and duplex communications can also be employed for making available data base records that describe interactive remote services. These records are labeled "action records." Action records are delivered to the local terminal in precisely the same manner as other data records, whether through the simplex or duplex communications channel. When a user presses a key at 140 (FIG. 5), and that key is recognized as the "execute record key" (at 250, FIG. 9), the system determines, at 252, whether the record being viewed is tagged as an action record. If the record is not an action record, control returns to START, at 254, and processing continues as normal.

If the record being viewed is an action record, the apparatus determines, at 256, the remote system associated with the record and establishes, at 258, a connection with that remote system. After the connection has been established, the apparatus operates according to the specification in the record and performs the necessary action in the remote system. In particular, the apparatus can forward the user's keystrokes to the remote system and display data received from the remote system. This is indicated at 260. This process continues until either the remote system or the user indicates that it wishes to terminate the connection. This is indicated at 262. Once that request has been received, control then returns to START, at 264.

This method advantageously provides the same benefits of economy and flexibility for records containing information about interactive services as is provided for other types of records. In addition, the method described in connection with FIG. 9 provides a convenient way for users to access remote interactive services in an automatic fashion without concern with regard to where or how those services are implemented.

Additions, subtractions, deletions, and other modifications of the described embodiment will be apparent to those practiced in the art and are within the scope of the following claims.

What is claimed is:

1. An information delivery system comprising
means for receiving and storing information at a central data base site,
means for transmitting data stored in said storing means over a broadcast simplex communications system,
local terminal means for locally receiving said broadcast data, said local terminal comprising
means for locally storing a selected subset of said received broadcast data,
means responsive to a user inquiry for searching said locally stored data for displaying that locally stored data responsive to said user inquiry, and
means for automatically communicating said user inquiry over a duplex communications channel to said central data base site storage when said local terminal means cannot fully respond to said user inquiry, and
means, at said central data base site, responsive to said user inquiry communicated from said local terminal means over said duplex communications system, for responding to said local terminal means by sending to said terminal means over said duplex channel information responsive to said user inquiry.

2. The information delivery system of claim 1 further comprising
means at the central data base site for preparing an index describing the contents of the data bases,
means for transmitting said index to said local terminal over said simplex system,
means for storing said index at said local terminal, and
means for periodically updating said stored index at the local terminal.

3. The information delivery system of claim 1 wherein said user inquiry responsive means comprises
means for determining whether a user inquiry can be satisfactorily answered by reference to each data base at the local terminal and at the central site, and
means responsive to the determining means for selecting the lowest cost data base to satisfy said user inquiry.

4. The information delivery system of claim 1 further wherein said determining means comprises
means for narrowing a user inquiry for satisfying said narrowed inquiry within a data base.

5. The information delivery system of claim 1 wherein said information storage means comprises
a plurality of independent data bases, each data base comprising
a plurality of records, each record having a plurality of required fields and one or more optional fields, said required fields including at least one of a record type, a record entry date, a record entry time, and one or more record textual descriptors.

6. The information delivery system of claim 5 wherein said independent data bases comprise
data bases having identical records.

7. The information delivery system of claim 5 wherein
at least two of said data bases have different content structures but the same record field format structure.

8. The information delivery system of claim 1 further wherein said information storage means comprises
a plurality of predicate model data bases, and
said local storing means stores data as a predicate model data base.

9. The information delivery system of claim 8 wherein each said user inquiry is a predicate descriptor for use in searching said data bases, and
further comprising boolean logic means for operating on said predicate descriptors.

10. The information delivery system of claim 1 wherein said locally storing means comprises
means for determining said selected subset of data based upon a user supplied priority listing and a user supplied budget listing.

11. The information delivery system of claim 10 further comprising, at the local terminal,
means for interactively and dynamically updating said priority listing and said budget listing during receipt of said transmitted data.

12. The information delivery system of claim 10 further comprising at the local terminal
means for signaling the arrival of a new record which matches a listing on said priority listing using at least one of an audible and a visual signal.

13. The information delivery apparatus of claim 1 wherein said duplex communications system comprises
means for terminating a duplex connection which has been idle for a selected fixed time duration.

14. The information delivery apparatus of claim 1 further comprising, at the local terminal,
means for storing a decryption key unknown to the user of the local terminal, and
means, using said decryption key, for decoding incoming broadcast data.

15. The information delivery apparatus of claim 1 wherein said transmitted broadcast data includes electronic mail communications.

16. The information delivery system of claim 1 wherein said responsive means at said central data base site comprises
means for effecting backcalls for providing incremental results to said local terminal means, and
means for aborting an automatically initiated inquiry to said central data base site.

17. The information delivery system of claim 1 wherein said central data base site responsive means comprises
means for controlling the flow rate of data from said central data base site in response to a user initiated inquiry.

18. The information delivery system of claim 1 further wherein said transmitting means comprises
means for transmitting less than all the information stored at said central data base site, and
means for appending at least one data tag to said transmitted data identifying deficiencies in said data, and
further comprising at the local terminal,
means responsive to recognizing when a data record has associated therewith a said tag and for fetching from a source identified by each said recognized tag the information necessary to obtain the remainder of the data.

19. The information delivery system of claim 1 wherein records of said information have associated therewith tag designating action records, and
further comprising at said local terminal
means responsive to a user inquiry for determining when a record is an action record,
means for establishing a connection to a remote system identified by any said determined action record, and
means for performing actions in said remote system as specified by said action record.

20. The information delivery system of claim 19 further wherein said performing means comprises
means for forwarding keystrokes to the remote system, and for receiving data from said remote system.

21. An information delivery method comprising the steps of
storing information at a central data base site,
transmitting data stored at said central site over a broadcast simplex communications system,
locally receiving said broadcast data and storing a selected subset of said received broadcast data at a remote local receiver terminal,
searching said locally stored data in response to a user inquiry for displaying locally stored data responsive to said user inquiry,
automatically communicating said user inquiry over a duplex communications channel to said central data base site when said locally stored data cannot fully respond to said user inquiry, and
responding, at said central data base site, to said locally generated user inquiry over said duplex communications channel, by sending over said duplex channel information stored at said central data base site which is responsive to said user inquiry.

22. The information delivery method of claim 21 further comprising the steps of
preparing at the central data base site an index describing the contents of the data bases,
transmitting said index to said local terminal over said simplex system,
storing said index at said local terminal, and
periodically updating said stored index at the local terminal.

23. The information delivery method of claim 21 wherein said searching step further comprises the steps of
determining whether a user inquiry can be satisfactorily answered by reference to each data base at the local terminal and at the central site, and
selecting, in response to the determining step, the lowest cost data base to satisfy said user inquiry.

24. The information delivery method of claim 21 further wherein said determining step comprises the steps of
narrowing a user inquiry, and
satisfying said narrowed inquiry within a data base.

25. The information delivery method of claim 21 wherein said information storing step comprises the step of
providing a plurality of independent data bases having a plurality of records, each record having a plurality of required fields and one or more optional fields, said required fields including at least one of a record type, a record entry date, a record entry time, and one or more record textual descriptors.

26. The information delivery method of claim 25 further comprising the step of
providing data bases having in part identical records.

27. The information delivery method of claim 25 comprising the step of
providing at least two of said data bases with different content structures but the same record field format structure.

28. The information delivery system of claim 21 further comprising the steps of
providing a plurality of predicate model data bases, and
storing data at the local terminal as a predicate model data base.

29. The information delivery method of claim 28 further comprising the steps of
providing each said user inquiry as a predicate descriptor for use in searching said data bases, and
operating on said predicate descriptors using boolean logic.

30. The information delivery method of claim 21 wherein said locally storing step comprises the step of
determining said selected subset of data based upon a user supplied priority listing and a user supplied budget listing.

31. The information delivery method of claim 30 further comprising at the local terminal, the step of
means for interactively and dynamically updating said priority listing and said budget listing during receipt of said broadcast data.

32. The information delivery method of claim 30 further comprising the step of
signaling the arrival of a new record which matches a listing on said priority listing using at least one of an audible and a visual signal.

33. The information delivery method of claim 21 wherein said communications step comprises the step of
terminating a duplex connection which has been idle for a selected fixed time duration.

34. The information delivery method of claim 21 further comprising, at the local terminal, the steps of
storing a decryption key, unknown to the user, at the local terminal, and
decoding incoming broadcast data using said decryption key.

35. The information delivery method of claim 21 comprising the step of providing electronic mail communications in said transmitted broadcast data.

36. The information delivery method of claim 21 wherein said user inquiry responding step comprises the steps of
effecting backcalls for providing incremental results to said local receiver terminal, and
aborting an automatically initiated inquiry to said central data base site.

37. The information delivery method of claim 21 wherein said responding step comprises the step of
controlling the flow rate of data from said central data base site in response to a user initiated, local terminal inquiry.

38. The information delivery method of claim 21 further wherein said transmitting step comprises the steps of
transmitting less than all the information stored at said central data base site, and
appending at least one data tag to said transmitted data identifying deficiencies in said data, and
further comprising the step of
responding at the local terminal by recognizing when a record associated therewith has a said tag and for fetching from a source identified by each said recognized tag the information necessary to obtain the remainder of the data.

39. The information delivery method of claim 21 further comprising the steps of
associating a tag designating an action record to selected records of said information,
responding to a user inquiry at the local terminal by determining when a record is an action record,
establishing a communication link to a remote system identified by any such determined action record, and
performing actions in said remote system as specified by said action record.

40. The information delivery method of claim 39 wherein said performing step comprises the steps of
forwarding keystrokes to the remote system, and
receiving data from said remote system.

* * * * *

UNITED STATES PATENT AND TRADEMARK OFFICE
CERTIFICATE OF CORRECTION

PATENT NO. : 4,845,658
DATED : July 4, 1989
INVENTOR(S) : David K. Gifford

It is certified that error appears in the above—identified patent and that said Letters Patent is hereby corrected as shown below:

Column 5, line 63, after "data" insert --base. First, it is suitable for dealing with texts and other--.

Column 13, line 14, "[A false], D" should be --[A: false], DB--.

Column 13, line 55, after "the" (first occurrence), insert --remainder of the record is at the central data base site. If such--.

Signed and Sealed this

Twenty-second Day of May, 1990

Attest:

HARRY F. MANBECK, JR.

*Attesting Officer*  *Commissioner of Patents and Trademarks*